United States Patent
Hazlewood et al.

(10) Patent No.: US 9,376,039 B1
(45) Date of Patent: Jun. 28, 2016

(54) SEAT BACK FRAME ASSEMBLY WITH INTERFERENCE MEMBER

(71) Applicant: Toyota Motor Engineering & Manufacturing North America, Inc., Erlanger, KY (US)

(72) Inventors: Robert Joseph Hazlewood, Plymouth, MI (US); Patrick J. Edgar, Ann Arbor, MI (US); Yi-Ru Chen Sosnowski, Ann Arbor, MI (US); Leon Toma, Commerce Township, MI (US); Phouvadol Peter Khouphongsy, Saline, MI (US); Chad Anderson, Canton, MI (US); Jonathan Y. San, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/563,556

(22) Filed: Dec. 8, 2014

(51) Int. Cl.
*B60N 2/42* (2006.01)
*B60N 2/427* (2006.01)
*B60R 21/00* (2006.01)
*B60N 2/68* (2006.01)
*B60N 2/64* (2006.01)

(52) U.S. Cl.
CPC .. *B60N 2/42* (2013.01); *B60N 2/64* (2013.01); *B60N 2/68* (2013.01)

(58) Field of Classification Search
CPC ............... B60N 2/42; B60N 2/64; B60N 2/68
USPC ........................................ 297/216.13, 452.18
See application file for complete search history.

(56) References Cited

U.S. PATENT DOCUMENTS

| | | | |
|---|---|---|---|
| 4,536,030 A | 8/1985 | Sakurada et al. | |
| 4,636,000 A | 1/1987 | Nishino | |
| 4,679,854 A * | 7/1987 | Putsch | B60N 2/00 297/216.13 |
| 4,913,491 A | 4/1990 | Mizuno et al. | |
| 5,425,569 A | 6/1995 | Hayes | |
| 6,450,574 B1 | 9/2002 | Umezawa et al. | |
| 6,592,166 B2 | 7/2003 | Motozawa | |
| 7,232,150 B2 * | 6/2007 | Nagayama | B60R 21/20 297/216.13 X |
| 7,562,902 B2 * | 7/2009 | Osterhout | B60R 21/207 280/728.1 |
| 7,631,933 B2 | 12/2009 | Fujita et al. | |
| 8,474,858 B2 * | 7/2013 | Urabe | B60R 21/207 297/216.13 X |
| 8,602,449 B2 * | 12/2013 | Kojima | B60N 2/449 297/216.13 X |

(Continued)

FOREIGN PATENT DOCUMENTS

| | | |
|---|---|---|
| JP | 4637249 B2 | 2/2011 |
| JP | 2011056979 A | 3/2011 |
| JP | 4948926 B2 | 6/2012 |

*Primary Examiner* — Rodney B White
(74) *Attorney, Agent, or Firm* — Dinsmore & Stohl LLP

(57) ABSTRACT

A seat back frame assembly and seat assembly are provided. The seat back frame assembly includes a pair of side members spaced apart from each other, a top member spaced apart from a bottom member, each of the top and bottom members interconnecting each of the pair of side members so as to define a peripheral edge, the peripheral edge enclosing a back space. An interference member is disposed within the back space and spaced apart from an inner surface of one of the pair of side members. The interference member disposed above a midpoint of the one of the pair of side members and includes a sliding surface angled obtusely with respect to the back space so as to direct an occupant forward of the back space and away from the side member when experiencing a side load.

10 Claims, 5 Drawing Sheets

(56) References Cited

U.S. PATENT DOCUMENTS

| | | | | |
|---|---|---|---|---|
| 8,888,176 B2 * | 11/2014 | Kaku | ................... | B60N 2/4235 297/216.13 |
| 8,888,177 B2 * | 11/2014 | Kaku | ................... | B60N 2/4235 297/216.13 |
| 2006/0152060 A1 * | 7/2006 | Nagayama | .............. | B60R 21/20 297/452.18 |
| 2012/0043791 A1 * | 2/2012 | Kojima | ................... | B60N 2/449 297/216.13 X |
| 2015/0360596 A1 * | 12/2015 | Eisenbraun | ............ | B60N 2/682 297/452.18 X |

* cited by examiner

SEAT BACK FRAME ASSEMBLY WITH INTERFERENCE MEMBER

TECHNICAL FIELD

A seat back frame assembly having an interference member configured to direct a passenger from a side member of the seat frame is provided.

BACKGROUND OF THE INVENTION

Seat back frame assemblies include a pair of side members spaced apart from each other. A top member extends between the top ends of a respective side member and a bottom member encloses the bottom ends of the side members. The seat back frame assembly is typically covered with a foam cushion, so as to form a seat back. The foam cushion is generally deformable so as to provide comfort to the user's back. The seat back frame assembly may be mounted to a seat frame having a seat cushion. In particular, in automotive use the seat back frame assembly is typically pivotably mounted to the seat frame so as to allow the user to adjust the angle of the seat back for comfort. However, as the seat back frame assembly is encompassed with foam, a side load may cause the passenger to compress the foam and further displace the occupant into a side member. Accordingly, it remains desirable to have a seat back frame assembly wherein the passenger is directed away from the side member.

SUMMARY OF THE INVENTION

A seat back frame assembly and a seat assembly are provided. The seat back frame assembly includes a pair of side members. The side members are formed of a generally durable and rigid material. The side members are elongated and spaced apart from each other. A top member is spaced apart from a bottom member. Each of the top and bottom members interconnect each of the pair of side members defining the peripheral edge of the seat back frame assembly. The peripheral edge encloses a space which defines a back space.

The seat back frame assembly includes an interference member. The interference member is disposed within the back space and is spaced apart from an inner surface of one of the pair of side members. The interference member is disposed above a midpoint of the side member. The interference member includes a sliding surface. The sliding surface is angled obtusely with respect to the back space so as to direct an occupant forward of the back space and away from the side member when experiencing a side load.

The seat assembly includes a seat cushion having a seat frame and a seat back frame assembly pivotably mounted to the seat frame. The seat back frame assembly includes a pair of side members. Each of the pair of side members is spaced apart from the other. A top member is spaced apart from a bottom member. Each of the top and bottom members interconnect each of the pair of side members so as to define a peripheral edge of the seat back frame assembly. An interference member is disposed within the back space and is spaced apart from an inner surface of one of the pair of side members. The interference member is disposed above a midpoint of the side member so as to be positioned to engage the side of an occupant. The interference member includes a sliding surface. The sliding surface is angled obtusely with respect to the back space so as to direct an occupant forward of the back space and away from the side member.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be better understood when read in conjunction with the following drawings where like structure is indicated with like reference numerals and in which:

DETAILED DESCRIPTION OF THE PREFERRED EMBODIMENTS

Figure 1:
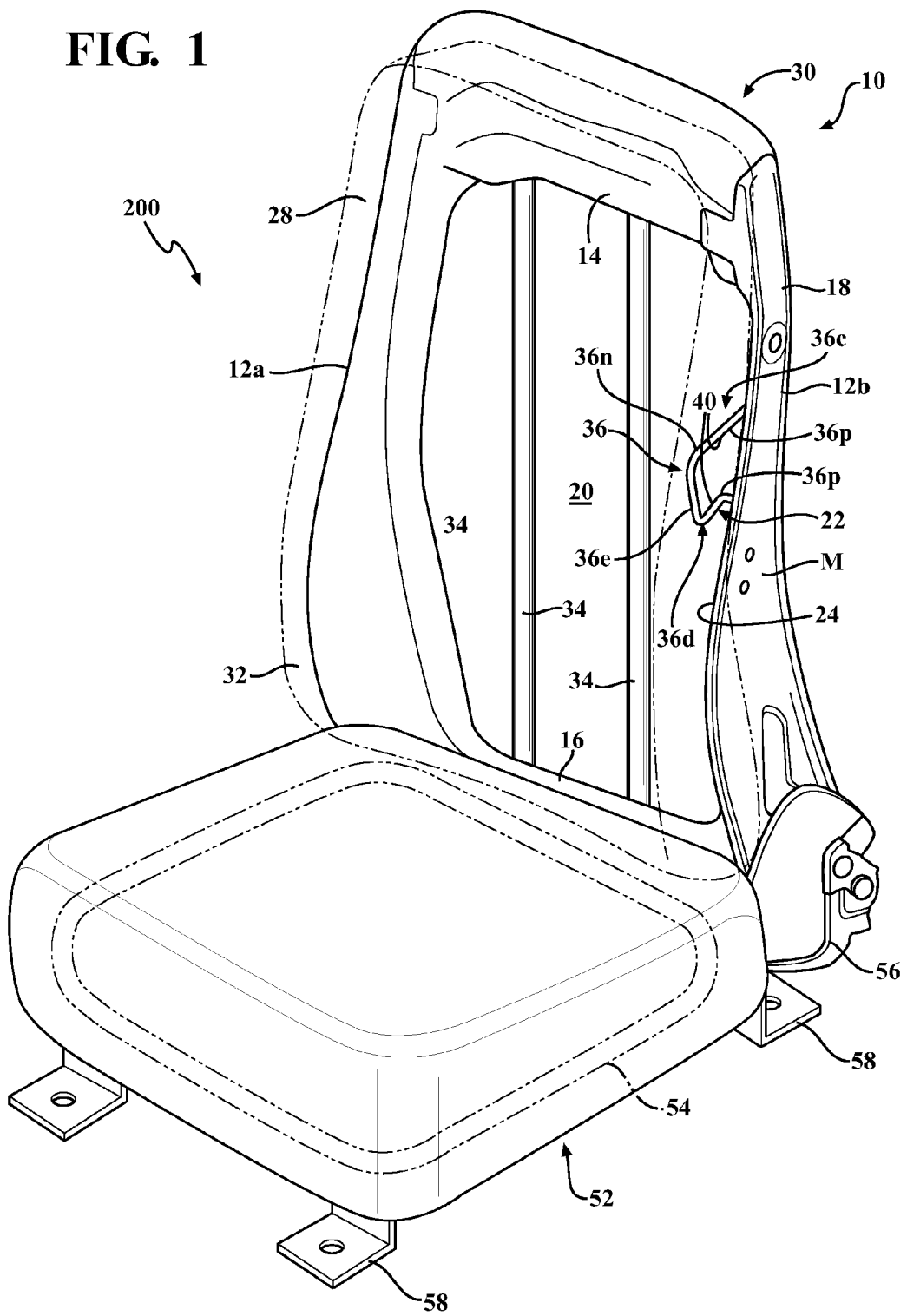
FIG. 1 is a perspective view of a first preferred embodiment of a seat assembly and seat back frame assembly wherein the interference member is a wire.

The embodiments described herein generally relate to a seat back frame assembly 10 and a seat assembly 200 for use in an automotive vehicle (not shown). The seat back frame assembly 10 includes a pair of side members 12a, 12b. Each of the side members 12a, 12b is spaced apart from each other. A top member 14 is spaced apart from a bottom member 16. Side members 12a, 12b and top and bottom members 14, 16 are formed of a generally durable and rigid material such as steel. The top member 14 and bottom member 16 interconnect each of the side members 12a, 12b at a respective proximal and distal edges of the side members 12a, 12b so as to define a peripheral edge 18 of the seat back frame assembly 10. The peripheral edge 18 encloses a back space 20.

The seat back frame assembly 10 includes an interference member 22 disposed within the back space 20 and spaced apart from an inner surface 24 of side member 12b. The interference member 22 is positioned above a midpoint ("M") of side member 12b so as to engage the side of an occupant's body. The interference member 22 includes a sliding surface 26. The sliding surface 26 is angled obtusely with respect to the back space 20 so as to direct an occupant forward of the back space 20 and away from the side member 12b when the occupant experiences a load which displaces the occupant laterally and into the side of the seat back frame assembly 10.

With reference now to FIG. 1, a first preferred embodiment of the seat back frame assembly 10 is provided. The seat back frame assembly 10 includes a pair of side members 12a, 12b. Each of the pair of side members 12a, 12b is spaced apart from the other. The side members 12a, 12b are interconnected by a top member 14 and a bottom member 16. The top and bottom members 14, 16 are spaced apart from each other so as to define a peripheral edge 18 of the seat back frame assembly 10. The peripheral edge 18 defines a back space 20. The side members 12a, 12b, top member 14, and bottom member 16 are formed of a generally durable and rigid material such as steel. A foam cushion 28, indicated by the dashed lines, encapsulates the seat back frame assembly 10 so as to define a seat back 30. It should be appreciated that the foam cushion may be formed of a deformable material which may compress due to the weight of the user.

The seat back frame assembly 10 includes an interference member 22. The interference member 22 is disposed within the back space 20 and is fixedly mounted to the side member 12b. The interference member 22 is above a midpoint M of the side member 12b so as to engage the side of an occupant preventing the ribs of the occupant from engaging the side member 12b. Each of the pair of side members 12a, 12b has a width "W" as measured along an axis generally orthogonal to a plane of the back space 20, and a portion of the interference member 22 is disposed along a plane generally parallel to the width of the pair of side members 12a, 12b. It should be appreciated that the seat back frame assembly 10 may be designed to accommodate a certain torso height, and that the midpoint M as defined herein is generally aligned with the center of the torso height for which the seat back 30 assembly is designed.

Figure 4:
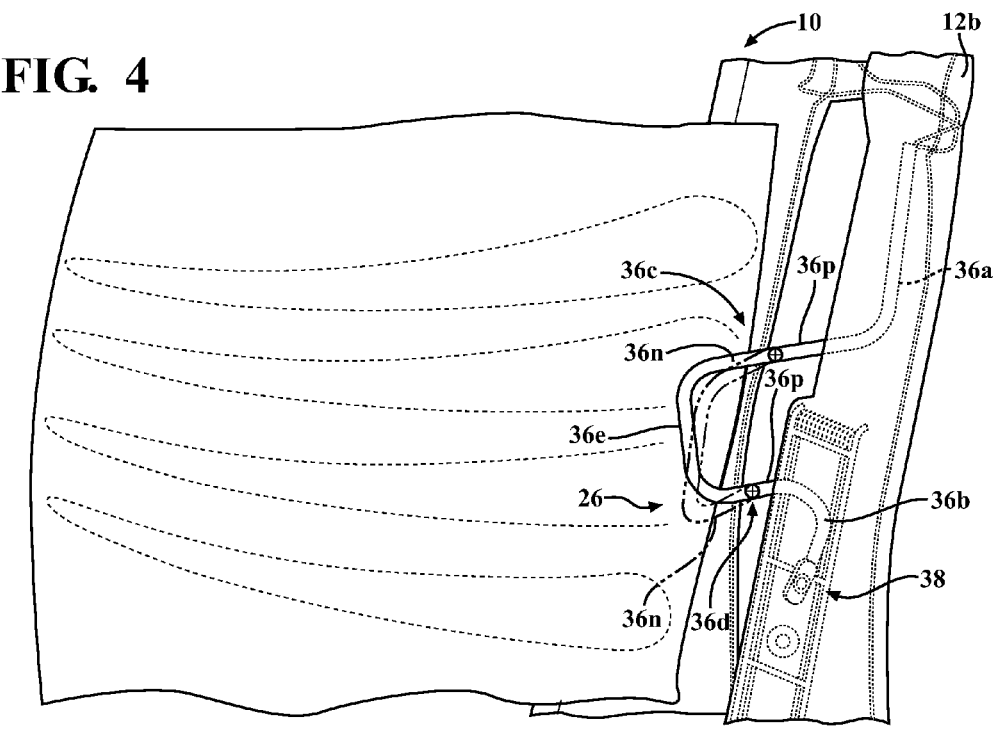
FIG. 4 is an isolated view of FIG. 1 showing the relationship between the interference member and the side of the occupant.
Figure 5:
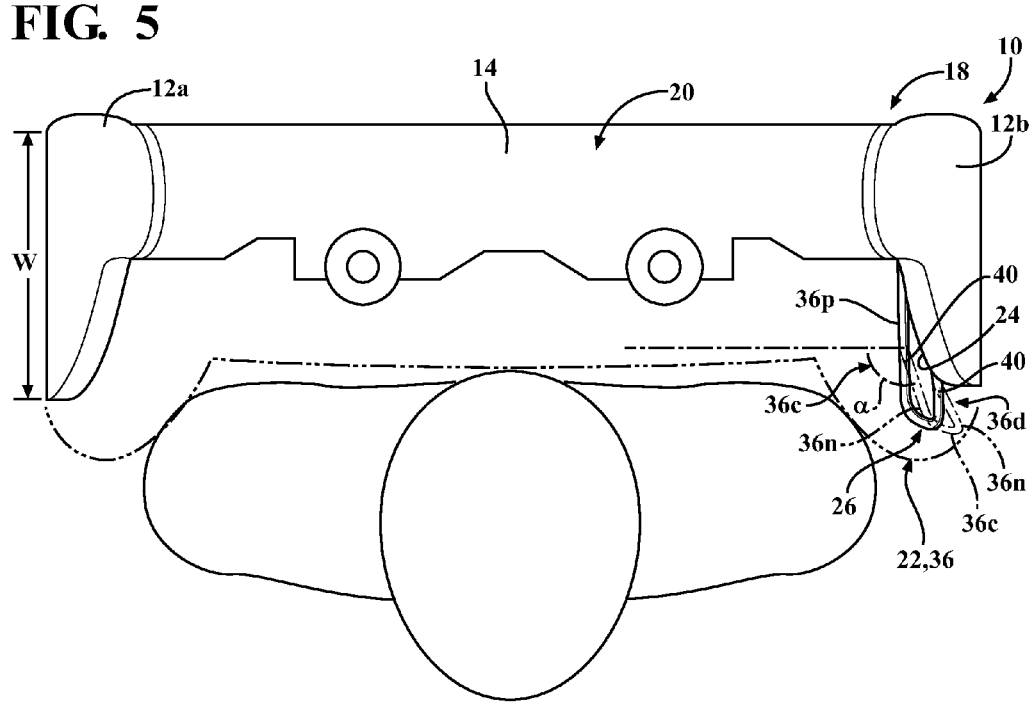
FIG. 5 is a top down view of FIG. 1 showing the position of the interference member with respect to the occupant and side member.

With reference now to FIGS. 4 and 5, the interference member 22 includes a sliding surface 26. The sliding surface 26 is angled obtusely, as indicated by "a" with respect to the back space 20. The interference member 22 is spaced apart from the side member 12b so as to direct an occupant forward of the back space 20 and away from the side member 12b when the occupant experiences a side load. As used herein, forward refers to the front surface 32 of the foam cushion 28 for which the user's back is intended to rest, the front surface 32 being displaced with respect to the back space 20. In other words, "forward" as used herein refers to the direction from the back space 20 to the front surface 32 of the seat back 30.

The seat back frame assembly 10 may further include a back support 34. The back support 34 is disposed on the back space 20 and may be mounted to the peripheral edge 18 of the seat back frame assembly 10. The back support 34 may be formed of a durable and rigid material such as steel or may be formed of a composite material such as plastic. The back support 34 is intended to provide structural support to the back space 20 so as to maintain the posture of the occupant.

With reference again to FIGS. 1, 3, 4 and 5, the interference member 22 is an elongated wire 36 formed of a durable and rigid material such as steel. The wire 36 includes a pair of legs 36a, 36b spaced apart from each other. The legs 36a, 36b include attachment structure 38 for fixing the interference member 22 to the side member 12b. The wire 36 further includes a pair of elongated portions 36c, 36d extending outwardly from the respective pair of legs 36a, 36b and a crossing portion 36e connecting the distal ends of the respective pair of elongated portions 36c, 36d together so as to form a U-shaped cross section.

Each of the pair of elongated portions 36c, 36d includes a pivot point 40. The pivot point 40 defines a proximate portion 36p of the elongated portions 36c, 36d and an end portion 36n of the elongated portions 36c, 36d. Each of the pair of side members 12a, 12b has a width "W" as measured along an axis generally orthogonal to a plane of the back space 20, and the proximate portion 36p of the interference member 22 is disposed along a plane generally parallel to the width of the pair of side members 12a, 12b. The pivot point 40 is configured to bend the end portions 36n of respective elongated portions 36c, 36d so as to form the sliding surface 26. The pivot point 40 may be formed by weakening the location of the respective elongated portions 36c, 36d so as to allow the end portions 36n of the respective elongated portions 36c, 36d to bend. Alternatively, the pivot point 40 may be formed by forming the elongated portions 36c, 36d with a predetermined length wherein the point of contact with the occupant deforms the elongated portions along the respective pivot point 40.

With reference specifically to FIGS. 4 and 5, an operation of the wire 36 is provided. The elongated portions 36c, 36d include pivot points 40a, 40b. Upon experiencing a load which moves the occupant towards the side member 12b, the occupant engages the interference member 22. As shown in FIG. 4, the occupant engages the crossing portion 36e and the ends of the elongated portions 36c, 36d bend about the pivot points 40a, 40b, wherein the ends of the elongated portions 36c, 36d form the sliding surface 26 so as to direct the occupant forward and away from the side member 12b, as indicated by the arrows shown in FIG. 4.

Figure 2:
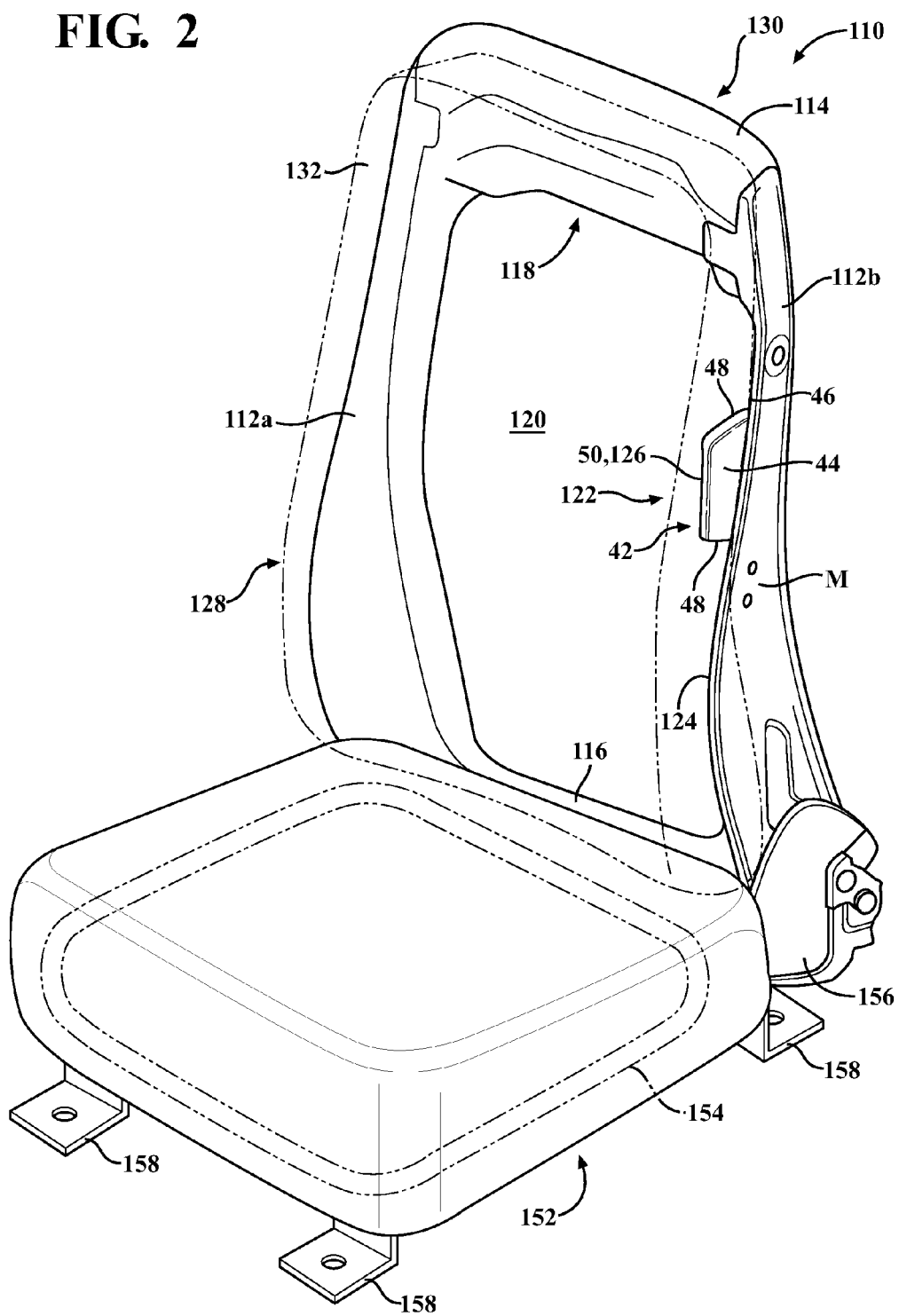
FIG. 2 is a perspective view of a second preferred embodiment of the seat assembly and seat back frame assembly wherein the interference member is a solid body.
Figure 3:
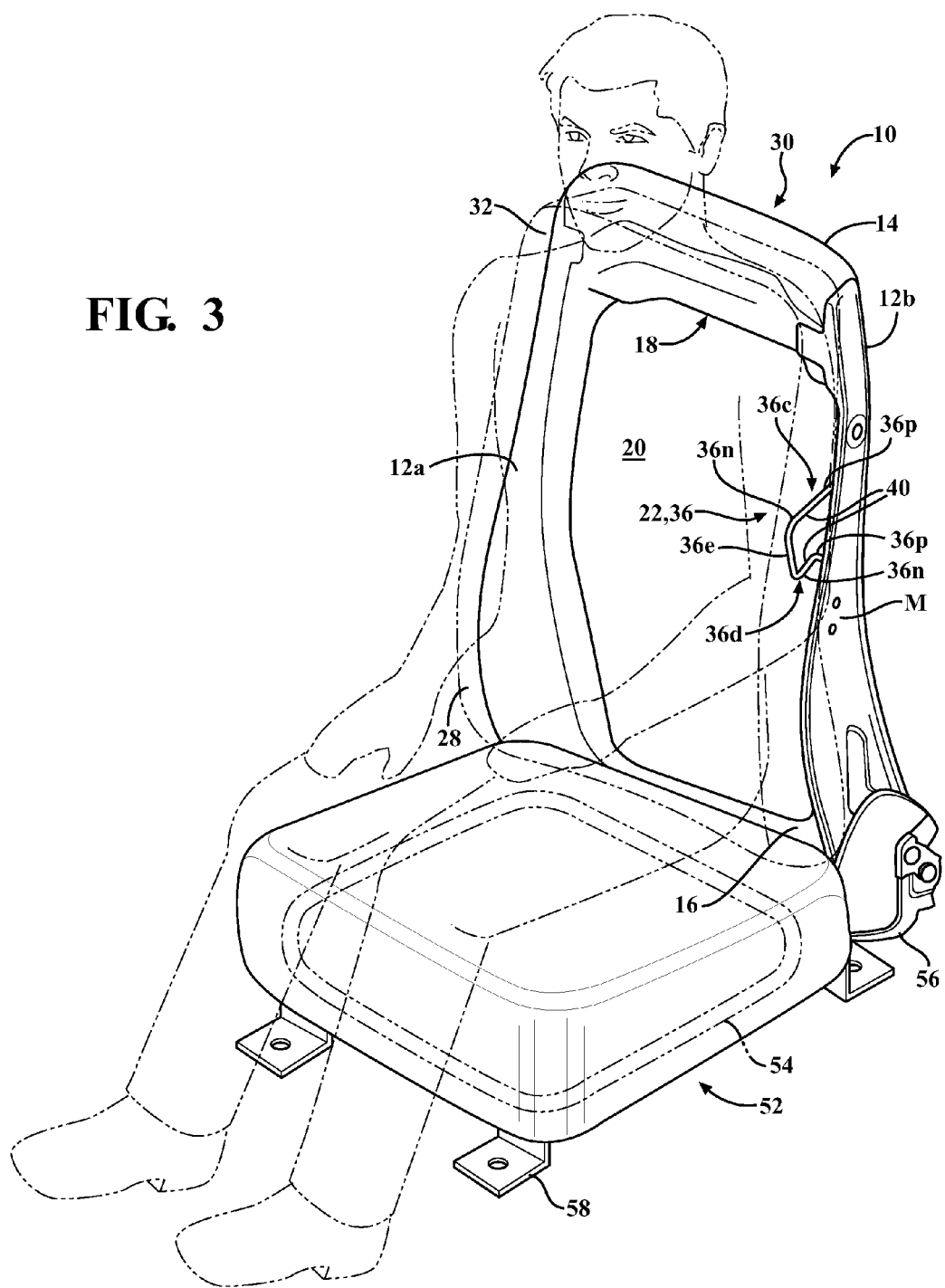
FIG. 3 is a view of FIG. 1 showing an occupant seated on the seat frame assembly.
Figure 6:
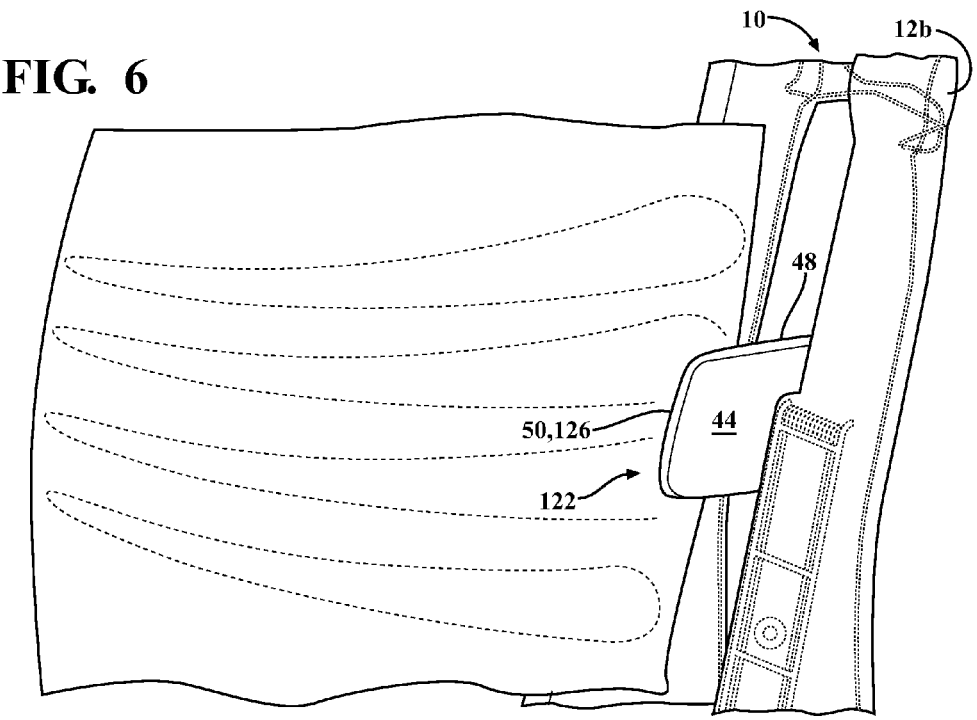
FIG. 6 is an isolated view of FIG. 2 showing the relationship between the interference member and the side of the occupant.
Figure 7:
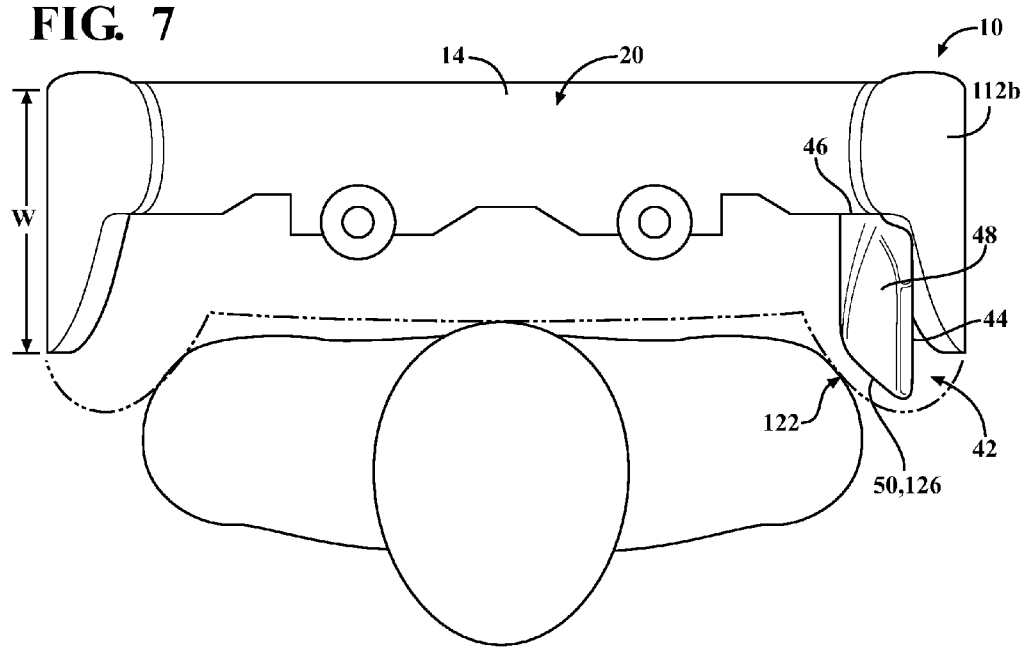
FIG. 7 is a top down view of FIG. 2 showing the position of the interference member with respect to the occupant and side member.

With reference now to FIGS. 2, 6 and 7, a second embodiment of the interference member 122 is provided, wherein like elements are indicated with a like reference number increased by 100. The interference member 122 has a body 42. The body 42 includes a base 44 and a back wall 46. The base 44 abuts against the side member 112b. The back wall 46 is generally orthogonal to the base 44 and may be fixed to the seat back frame 110. A pair of side walls 48 are disposed on opposite sides of the base 44. The back wall 46 extends between the side walls 48 and the side walls 48 are generally orthogonal to the base 44. A top surface 50 is angled obtusely with respect to the back space 20 so as to form and define the sliding surface 126. The body 42 may be formed of a durable and rigid material such as steel or a polymer composite such as plastic or polyurethane. It should be appreciated that the interference member 122 is also enclosed with the cushion material.

With reference again to FIGS. 6 and 7, an operation of the second embodiment of the interference member 122 is provided. With reference first to FIG. 7, a top down view of the interference member 122 is provided which shows the sliding surface 126. As is shown, the sliding surface 126 is angled obtusely with respect to the back space 120. The sliding surface 126 is spaced apart from and facing the side of the occupant. Upon experiencing a load directing the occupant towards the side member 112b, the side of the occupant engages the sliding surface 126 of the body 42 which directs the occupant forward and away from side member 112b, as indicated by the arrow shown in FIG. 6.

With reference again to FIGS. 1 and 2, a seat assembly 200 is provided. The seat assembly 200 includes a seat cushion 52. The seat cushion 52 may be mounted to a seat frame 54 (shown in dashed lines). The seat frame 54 may include attachment structures 56 configured to pivotably attach the seat cushion 52 to seat back frame assembly 10. The seat frame 54 may include attachment structures 58 configured to attach the seat assembly 200 to the floor of an automotive vehicle (not shown). Alternatively, it should be appreciated that the seat frame 54 may be mounted to rails so as to enable the seat assembly 200 to slide back and forth.

The seat back frame assembly 10 includes a pair of side members 12a, 12b. Each of the pair of side members 12a, 12b is spaced apart from the other. The seat back frame assembly 10 further includes a top member 14 spaced apart from a bottom member 16. Each of the top and bottom members 14, 16 interconnect the pair of side members 12a, 12b so as to define a peripheral edge 18 of the seat back frame assembly 10. The peripheral edge 18 defines a back space 20.

The seat back frame assembly 10 further includes an interference member 22. The interference member 22 is disposed within the back space 20 and spaced apart from an inner surface 24 of the side member 12b. The interference member 22 is positioned above a midpoint M of one of the pair of side members 12a, 12b so as to be positioned to engage the side of an occupant.

The interference member 22 includes a sliding surface 26. The sliding surface 26 is angled obtusely with respect to the back space 20 so as to direct an occupant forward of the back space 20 and away from the side member 12b when experiencing a side load. The seat back frame assembly 10 may further include a back support 34 disposed on the back space 20. The back support 34 is fixed to the peripheral edge 18 of the back space 20. The side members 12a, 12b have a width measured along an axis generally orthogonal to the plane of the back space 20. A portion of the interference member 22 is disposed along a plane generally parallel to the width of the pair of side members 12a, 12b. The seat frame assembly may include a pair of interference members 22 each mounted to a respective one of the pair of side members 12a, 12b.

With reference now to FIGS. 1, 3, 4 and 5, the interference member 22 may be a wire 36. The wire 36 may be formed of a durable and rigid material such as steel. The wire 36 includes a pair of legs 36a, 36b. The pair of legs 36a, 36b are fixedly mounted to the inner surface 24 of one of the pair of side members 12a, 12b. A pair of elongated portions 36c, 36d extends outwardly from the respective pair of legs 36a, 36b and is generally orthogonal to the pair of legs 36a, 36b. A crossing portion 36e connects a distal end of the respective pair of elongated portions 36c, 36d so as to form a U-shaped cross section.

Each of the pair of elongated portions 36c, 36d includes a pivot point 40. The pivot point 40 defines a proximate portion 36p of the elongated portions 36c, 36d and an end portion 36n of the elongated portions 36c, 36d. Each of the pair of side members 12a, 12b has a width "W" as measure along an axis generally orthogonal to a plane of the back space, and the proximate portion 36p of the interference member 22 is disposed along a plane generally parallel to the width of the pair of side members 12a, 12b. The pivot points 40 are configured to bend the end portions 36n of respective elongated portions 36c, 36d so as to form the sliding surface 26. The pivot point 40 may be formed by weakening the location of the respective elongated portions 36c, 36d so as to allow the end portions 36n of the respective elongated portions 36c, 36d to bend. Alternatively, the pivot point 40 may be formed by forming the elongated portions 36c, 36d with a predetermined length wherein the point of contact with the occupant deforms the elongated portions along the respective pivot point 40.

With reference now to FIGS. 2, 6 and 7 the interference member 122 is a solid body 42 having a sliding surface 126 disposed on the solid body 42 opposite a base 44. The base 44 abuts against the side member 112b. The back wall 46 is generally orthogonal to the base 44 and may be fixed to the seat back frame 110. A pair of side walls 48 are disposed on opposite sides of the base 44. The back wall 46 extends between the side walls 48 and the side walls 48 are generally orthogonal to the base 44. A top surface 50 is angled obtusely with respect to the back space 20 so as to form and define the sliding surface 126. The body 42 may be formed of a durable and rigid material such as steel or a polymer composite such as plastic or polyurethane. It should be appreciated that the interference member 122 is also enclosed with the cushion material.

While particular embodiments have been illustrated and described herein, it should be understood that various other changes and modifications may be made without departing from the spirit and scope of the claimed subject matter. For instance, the drawings show only one interference member, however, the seat back frame assembly or seat assembly may include two interference members, each axially aligned with each other and each spaced apart from respective inner surfaces of side members 12a, 12b. Each interference member further being disposed a respective midpoint M of side members 12a, 12b, Moreover, although various aspects of the claimed subject matter have been described herein, such aspects need not be utilized in combination.

The invention claimed is:

1. A seat back frame assembly comprising:
    a pair of side members, each of the pair of side members is spaced apart from the other;
    a top member spaced apart from a bottom member, each of the top and bottom members interconnecting each of the pair of side members so as to define a peripheral edge, the peripheral edge enclosing a back space; and
    an interference member, the interference member is disposed within the back space and spaced apart from an inner surface of one of the pair of side members, and the interference member is further disposed above a midpoint of the one of the pair of side members, the interference member is a wire, the wire having a pair of legs fixedly mounted to the inner surface of one of the pair of side members, a pair of elongated portions extending from a respective pair of legs, a crossing portion connecting a distal end of a respective pair of elongated portions so as to form a U-shaped cross-section, each of the pair of elongated portions having a pivot point so as to bend an end portion of the respective pair of elongated portions upon engagement of the side of the occupant so as to form a sliding surface, the sliding surface positioned forward of the one of the pair of side members, the sliding surface being angled obtusely with respect to the back space so as to direct an occupant forward of the back space and away from the side member when experiencing a side load.

2. The seat back frame assembly as set forth in claim 1, further including a back support disposed on the back space, the back support mounted to the top and bottom members.

3. The seat back frame assembly as set forth in claim 1, each of the pair of side members has a width as measured along an axis generally orthogonal to a plane of the back space, and a portion of the interference member is disposed along a plane generally parallel to the width of the pair of side members.

4. The seat back frame assembly as set forth in claim 1, wherein the interference member is fixed to one of the pair of side members.

5. The seat back frame assembly as set forth in claim 4, wherein the interference member is fixed to a portion of the one of the pair of side members so as to be vertically aligned with the ribs of an occupant having a predetermined torso height.

6. A seat assembly comprising:
    a seat cushion; and
    a seat back frame assembly pivotably mounted to the seat cushion, the seat back frame assembly having a pair of side members, each of the pair of side members spaced apart from the other, a top member spaced apart from a bottom member, each of the top and bottom members interconnecting each of the pair of side members so as to define a peripheral edge of the seat frame assembly, the peripheral edge defining a back space, and an interference member, the at least one interference member disposed within the back space and spaced apart from an inner surface of one of the pair of side members, and interference member further disposed above a midpoint of the one of the pair of side members, the interference member is a wire, the wire having a pair of legs fixedly mounted to the inner surface of one of the pair of side members, a pair of elongated portions extending from a respective pair of legs, a crossing portion connecting a distal end of a respective pair of elongated portions so as to form a U-shaped cross-section, each of the pair of elongated portions having a pivot point so as to bend an end portion of the respective pair of elongated portions upon engagement of the side of the occupant so as to form a sliding surface, the sliding surface positioned forward of the one of the pair of side members, the sliding surface being angled obtusely with respect to the back space so as to direct an occupant forward of the back space and away from the side member when experiencing a side load.

7. The seat frame assembly as set forth in claim 6, further including a back support disposed on the back space, the back support mounted to the top and bottom members.

8. The seat frame assembly as set forth in claim 6, each of the pair of side members has a width as measured along an axis generally orthogonal to a plane of the back space, and a portion of the interference member is disposed along a plane generally parallel to the width of the pair of side members.

9. The seat frame assembly as set forth in claim 6, wherein the interference member is fixed to one of the pair of side members.

10. The seat frame assembly as set forth in claim 9, wherein the interference member is fixed to a portion of the one of the pair of side members so as to be vertically aligned with the ribs of an occupant having a predetermined torso height.

* * * * *